(12) United States Patent
Tan

(10) Patent No.: US 9,104,356 B2
(45) Date of Patent: Aug. 11, 2015

(54) EXTENDABLE SYSTEM FOR PREPROCESSING PRINT DOCUMENT AND METHOD FOR THE SAME

(71) Applicants: PEKING UNIVERSITY FOUNDER GROUP CO., LTD., Beijing (CN); FOUNDER INFORMATION INDUSTRY GROUP, Beijing (CN); BEIJING FOUNDER ELECTRONICS CO., LTD., Beijing (CN)

(72) Inventor: Lei Tan, Beijing (CN)

(73) Assignees: PEKING UNIVERSITY FOUNDER GROUP CO., LTD., Beijing (CN); FOUNDER INFORMATION INDUSTRY GROUP, Beijing (CN); BEIJING FOUNDER ELECTRONICS CO., LTD., Beijing (CN)

( * ) Notice: Subject to any disclaimer, the term of this patent is extended or adjusted under 35 U.S.C. 154(b) by 0 days.

(21) Appl. No.: 14/095,281

(22) Filed: Dec. 3, 2013

(65) Prior Publication Data

US 2015/0055169 A1    Feb. 26, 2015

(30) Foreign Application Priority Data

Aug. 22, 2013   (CN) .......................... 2013 1 0369753

(51) Int. Cl.
*G06F 3/12* (2006.01)

(52) U.S. Cl.
CPC ............ *G06F 3/1237* (2013.01); *G06F 3/1211* (2013.01); *G06F 3/1284* (2013.01)

(58) Field of Classification Search
USPC ............ 358/1.9, 2.1, 1.6, 401, 501, 1.15, 468
See application file for complete search history.

(56) References Cited

U.S. PATENT DOCUMENTS

| 8,511,776 | B2 * | 8/2013 | Tuttnauer et al. | 347/14 |
| 8,767,232 | B2 * | 7/2014 | Nakashio | 358/1.14 |
| 2004/0233484 | A1 * | 11/2004 | Seko et al. | 358/523 |
| 2005/0185012 | A1 * | 8/2005 | Yoshida | 347/19 |
| 2014/0285856 | A1 * | 9/2014 | Wen et al. | 358/474 |

* cited by examiner

*Primary Examiner* — Jerome Grant, II
(74) *Attorney, Agent, or Firm* — Hamre, Schumann, Mueller & Larson, P.C.

(57) ABSTRACT

A system for preprocessing a print document is disclosed. The system may comprise a document inputting unit, configured to receive a print document, a document processing unit, configured to process the print document that is received by the document inputting unit, and a document outputting unit, configured to output a print document that has been processed by the document processing unit. Further, a method for preprocessing a print document is also disclosed.

15 Claims, 4 Drawing Sheets

EXTENDABLE SYSTEM FOR PREPROCESSING PRINT DOCUMENT AND METHOD FOR THE SAME

BACKGROUND OF THE INVENTION

1. Field of the Invention

Embodiments of the present invention relates to computer processing before printing, especially to an extendable system for preprocessing a print document, and a method for the same, and a non-transient storage media in which a computer-executable program for realizing the method is stored.

2. Description of the Prior Art

Because of the software and hardware differences of printing crafts, requirements for the print documents from different printing plants may be different. Therefore, after receiving a print document, usually a printing plant may initially process the document to make it meet requirements of this plant. The initial processing may include document type conversion, document size adjustment, color mode conversion, image resolution adjustment, typeface processing and other parameter adjustment before printing and so on. The initial processing is usually called as preprocessing print documents.

The requirements of operational process for a print document from different printing plants may be different, thus preprocessing the print document may be still performed by production coordinators manually in most printing plants. A production coordinator may need to communicate with a client while check and process a document by using multiple software pieces sequentially. This method may result in the following problems: low efficiency, high labor cost, high error rate and so forth.

SUMMARY OF THE INVENTION

According to an aspect of the present invention, a system for preprocessing a print document is disclosed. The system may include a document inputting unit, configured to receive a print document, and a document processing unit, configured to process the print document that is received by the document inputting unit, and a document outputting unit, configured to output a print document that has been processed by the document processing unit.

According to another aspect of the present invention, a method of using a system for preprocessing a print document to perform preprocessing on print documents is disclosed. This system may include a document inputting unit, a document processing unit, a document outputting unit and a system scheduling unit. The method may include: receiving a print document by the document inputting unit; performing processing on the print document that is received by the document inputting unit, by the document processing unit; and outputting a print document that has been processed by the document processing unit, by the document outputting unit.

According to another aspect of the present invention, a non-transient storage media in which stored a computer-executable program for realizing a method for preprocessing a print document is disclosed.

DETAILED DESCRIPTION OF THE PREFERRED EMBODIMENTS

Next, embodiments of the present invention will be described in detail, in connection with the drawings.

Figure 1:
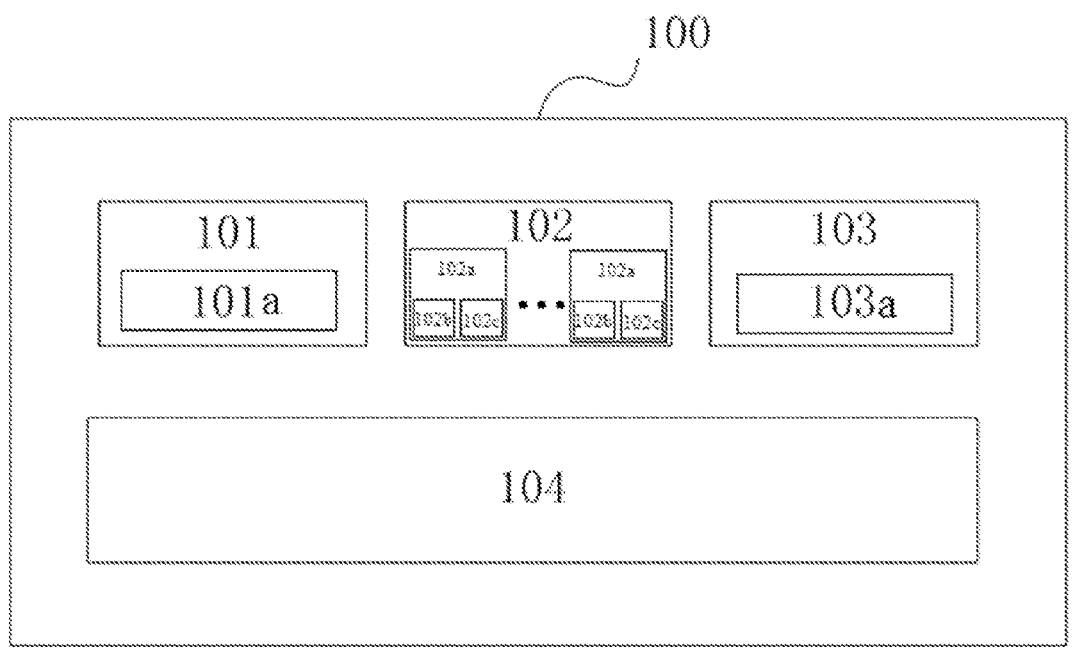
FIG. 1 is a schematic diagram illustrating the system structure according to an embodiment of the present invention.

As shown in FIG. 1, an extendable system 100 for preprocessing a print document may include a document inputting unit 101, a document processing unit 102, a document outputting unit 103 and a system scheduling unit 104.

The document inputting unit 101 may be configured to receive various print documents from different sources in different kinds of forms, and notify the system scheduling unit 104 of information of the documents. The document inputting unit 101 may include one or more document inputting functional module 101a. The document inputting functional module 101a may refer to a program assembly which may perform packaging according to a specified document input interface and may have a function of importing a new document from outside of the system, wherein the specified document input interface includes at least one startup method to be called by the system scheduling unit 104 after completing a system initialization. If the document inputting unit 101 includes a plurality of document inputting functional modules 101a, then after the completion of system initialization, the system scheduling unit 104 may call all the startup methods of the plurality of document inputting functional module 101a sequentially, causing a printing plant to realize to support with respect to a plurality of document sources.

According to different requirements from different printing plants, the realizing method of the document inputting functional module 101a may include but be not limited to: providing a document selection interface for manually importing a specified document by a user; automatically discovering and importing a document in the form of directory monitoring or a hot folder; integrating with an external system, and obtaining a document from the external system.

When receiving a new print document, the document inputting functional module 101a may submit the new document to the system scheduling unit 104 for subsequent processing.

Preferably, the document inputting functional module 101a may submit the new document to the system scheduling unit 104 in a way of event or callback.

Preferably, a plurality of document inputting functional modules 101a which exist at the same time operate respectively in different processes or threads. And the system scheduling unit 104 may synchronize the submitting operation of all document inputting functional modules 101a. In this way, a plurality of document inputting functional modules 101a may operate concurrently, so that the operational efficiency of the document inputting unit 101 can be improved.

The document processing unit 102 may include one or more document processing sub-units 102a. The document processing sub-unit 102a may include a document checking functional module 102b. The document checking functional module 102b may be provided with one or more document processing functional modules 102c. The document checking functional module 102b may be a program assembly which may perform packaging according to a specified document checking interface and may determine whether a document meets a requirement according to a specified standard. The document processing functional module 102c may be a program assembly attached to the document checking functional module 102b, and may perform packaging according to a specified document processing interface and process a specified document to cause the document to meet the specified requirement. Here, the specified document checking interface includes at least one document importing method to be called by the system scheduling unit 104, to submit a print document and have it checked. The document processing interface includes at least one document submitting interface to be called by the document checking functional module 102b, to submit a document which does not comply with the requirements.

During the system initialization, the system scheduling unit 104 may dynamically load all of the document processing sub-units 102a according to specified parameters in a configuration file, and sequence them in a specified order. After receiving a new print document, the system scheduling unit 104 may submit the new document to a first document processing sub-units 102a. The document checking functional module 102b of the first document processing sub-units 102a may determine whether the document complies with the specified standard (that is, whether requires further processing). If the document complies with the specified standard, then the system scheduling unit 104 may be notified that the document is normal; otherwise, the document checking functional module 102b may submit the document to its own document processing functional module 102c for processing. If a plurality of document processing functional modules 102c belong to one document checking functional module 102b, then the plurality of document processing functional modules 102c may be called one by one to process the document that fails to pass the checking. The document processing functional modules 102c may choose whether or not to process the document according to actual needs. If the document is not to be processed, then the system scheduling unit 104 may be notified that the document is incorrect; otherwise, the document processing functional modules 102c may preprocess the document, and notify the system scheduling unit 104 of the processing result. The system scheduling unit 104 may choose to terminate the process or continue to submit the document to the next document processing sub-unit for processing until the process terminates or all the document processing sub-units complete processing, according to specified parameters in the configuration file and the processing result that the document processing functional modules 102c returned. The system scheduling unit 104 may submit a document having been processed by the document processing unit 102 to the document outputting unit 103 for outputting.

According to different requirements from different printing plants, the contents to be checked by the document checking functional module 102b may include but be not limited to: document type checking, document size checking, color mode checking, image resolution checking, typeface checking and the checking of other before-printing parameters which may affect printing. On the other hand, the functions realized by the document processing functional modules 102c may include but be not limited to: document type conversion, document size adjustment, color mode conversion, image resolution adjustment, typeface processing and reporting an error without processing.

Preferably, each document processing sub-unit 102a operate in an independent process or thread. And the system scheduling unit 104 may maintain one queue of documents to be processed for each document processing sub-unit 102a, to improve the throughput of the document processing unit 102.

Preferably, with respect to a document processing function which occupies relatively more system resources, distributed development technology may be used. And the document processing sub-units 102a may be deployed on a plurality of computers, to improve the operation efficiency of the document processing unit 102.

Preferably, the document processing sub-unit 102a may submit a document checking or processing result to the system scheduling unit 104 in the way of event or callback.

Preferably, a plurality of document processing sub-units 102a may be illustrated by using a chain-like data structure in a memory.

Preferably, the plurality of document processing functional modules 102c that belong to the document checking functional module 102b may operate respectively in independent processes or threads. And the document checking functional module 102b may maintain one queue of documents to be processed for each document processing functional module 102c, to improve the throughput of the document processing sub-unit 102a.

Preferably, the plurality of document processing functional modules 102c that belong to the document checking functional module 102b may be illustrated by using a chain-like data structure in a memory.

The document outputting unit 103 may be an exit of the system, and in charge of receiving information from the system scheduling unit 104, and saving a qualified document to a specified storage location or submitting the same to a related external system.

The document outputting unit 103 may include one or more document outputting functional modules 103a. The document outputting functional module 103a may be a program assembly which can perform packaging according to a specified document output interface and save the document in a specified storage location or submit the document to a related external system. Here, the specified document output interface may include at least one document import method to be called by the system scheduling unit 104, to submit a document to be outputted. If the document outputting unit 103 includes a plurality of document outputting functional modules 103a, then the system scheduling unit 104 may call the document import method of each of the plurality of document outputting functional modules 103a sequentially, so that a printing plant may export documents having been processed in different ways at the same time, thus the documents may play different roles.

The system scheduling unit 104 may submit a document having been processed by the document processing unit 102 to the document outputting functional module 103a, to complete outputting of the document.

According to different requirements from different printing plants, the method for realizing the document outputting functional module 103a may include but be not limited to: exporting a document to a specified storage location; submitting the document to a related external system.

Preferably, a plurality of document outputting functional modules 103a which exist at the same time operate respectively in different processes or threads. And the system scheduling unit 104 may synchronize submitting operations of all document outputting functional modules 103a. In this way, a plurality of document outputting functional modules 103a may operate concurrently, so that the operational efficiency of the document outputting unit 103 may be improved.

The system scheduling unit 104 may be configured for system functional module management and document processing procedures scheduling, and be a basic unit throughout the system.

The system scheduling unit 104 may read a configuration file after system startup, load required functional modules from a disk according to the configuration file, read the attributes of the functional modules and related parameters, analyze the relationship between the functional modules, and construct them into one whole operation process in a memory.

Here, the configuration file may be a file formed by storing the basic information and program assembly of the functional modules, related parameters, calling sequence, result response strategies and so on into a disk in a specified format. Further, the result response strategies may be parameters defined by a user indicating that how should a caller of the functional modules respond to different processing results.

During operation of the system, each unit and each functional module are independent from each other. And the system scheduling unit 104 may be in charge of information flowing and service driving of the whole operation process. Using a feature that different printing plants have the same process for preprocessing a print document but have different functions specifically, the system scheduling unit 104 may realize a common frame for preprocessing a print document, simplify the developing and deploying of the various functional modules by using a configuration file and the dynamic loading technique, provide good scalability, and reduce the difficulty and cost of developing of the system for preprocessing a print document.

Preferably, the system scheduling unit 104 may be realized in a language supporting reflection mechanism (such as Java, C#, Ruby and so on).

Preferably, the configuration file may be saved in a disk in a form of storing object of the operation process. The system scheduling unit 104 may complete constructing the operation process by deserializing the configuration file.

Preferably, a modification indicator of the configuration file may be set in the memory, to support the system to modify functional module configurations during system operation without restarting the system. In this way, the system scheduling unit 104 needs to be in charge of the synchronized accessing to the configuration file and to make sure of the consistency and integrity of the document preprocessing procedures.

Preferably, before document processing by each document processing sub-unit 102a, the system scheduling unit 104 may backup the documents to be processed, and record a operation log during the checking processing, so that tracing and recovering may be performed in case of processing failure.

Four operational processes, i.e., system configuration and startup, printing template downloading, terminal user operation and user interface monitoring according to the embodiment of the present invention will be described in detail, in connection with the drawings.

Figure 2:
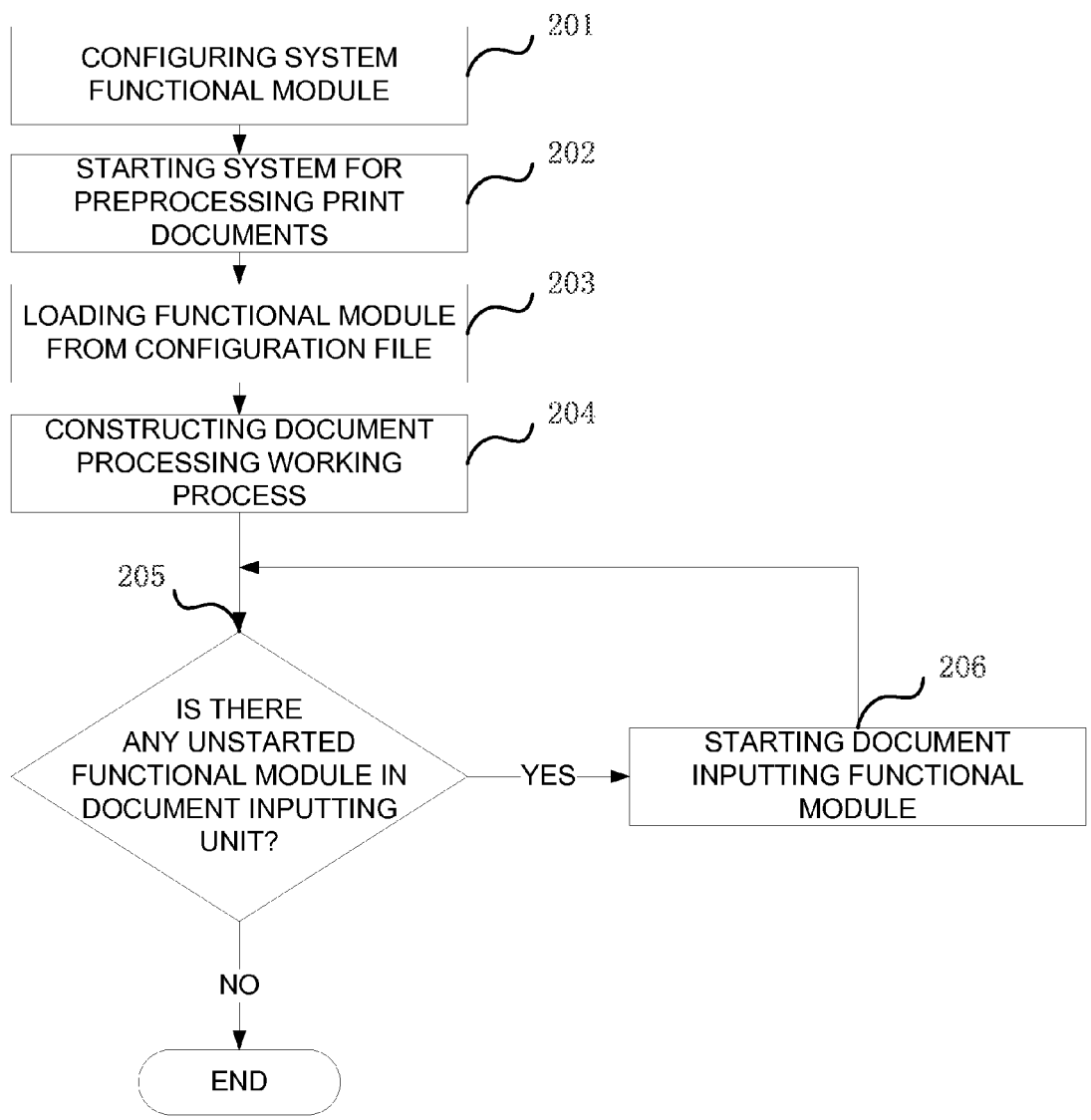
FIG. 2 is a flowchart illustrating configuration and startup of the system according to an embodiment of the present invention.

FIG. 2 is a flowchart illustrating configuration and startup of the system according to an embodiment of the present invention.

Step 201 may be that, adding or deleting a system functional module in the system configuration file according to a specified format, specifying the program assembly of current functional module, modifying a module parameter, or adjusting the position in operation process of the functional module, to complete the system functional module configuration.

Here, the specified format may be a configuration file format required by the system or a storing format of the operation process. For example, Extensible Markup language (XML) may be used as the specified format.

```
<Worflow>
    <Portal>
        <Module id="..." name="..." type="..." workpath="..."...>
            <Setting>...</ Setting >
        </ Module >
        ...
        < Module >
    </Portal>
    <Workshop>
        <Module id="..." name="..." type="..." workpath="..."...>
            <Setting>...</ Setting >
            <Processors>
                < Module ...><Setting>...</ Setting ></ Module >
            <\Processors>
        </ Module >
        <Module id="..." name="..." type="..." workpath="..."...>
            <Setting>...</ Setting >
            <Processors>
                < Module ...><Setting>...</ Setting ></ Module >
                < Module ...><Setting>...</ Setting ></ Module >
            <\Processors>
        </ Module >
        ...
        < Module... / >
    </Workshop>
    <Exit>
        <Module id="..." name="..." type="..." workpath="..."...>
            <Setting>...</ Setting >
        </ Module >
        ...
        </Module .../>
    <Exit>
<Worflow>
```

Here, each Module node may correspond to one system functional module. Portal node may correspond to the document inputting unit 101, Workshop node may correspond to the document processing unit 102, Exit node may correspond to the document outputting unit 103. Each Module node under the Portal node corresponds to one document inputting functional module 101a. Each sub-node Module of the Workshop node may correspond to one document processing sub-unit 102a. Processors node may correspond to one or more document processing functional module 102c that belong to a document checking functional module 102b. Each Module node under the Exit node may correspond to one document inputting functional module 103a. A Type attribute of a Module node may specify a program assembly to which a module belongs and type of the module. A Setting sub-node may specify the parameters related to the module. The sequence of the Module nodes belonging to the same parent node may determine the sequence of the functional modules being called. The relationship between the functional modules may be illustrated by the relationship between the Module nodes.

Step 202, the system for preprocessing print documents may start up.

Step 203, the system scheduling unit 104 may read a system configuration file, load a program assembly according to parameters specified by the configuration file, and create respective system functional module objects.

Step 204, the system scheduling unit 104 may translate the relationship between the modules in the configuration file, and construct a document processing working process. Or the configuration file may be deserialized directly, so that a specified document processing working process may be obtained.

Step 205, the system scheduling unit 104 may determine that whether there is an unstarted document inputting functional module 101a in the document inputting unit. If yes, then turn to step 206: calling the startup interface and start this module. Then repeat step 205 and step 206, until that all the document inputting functional modules 101*a* are started.

Figure 3:
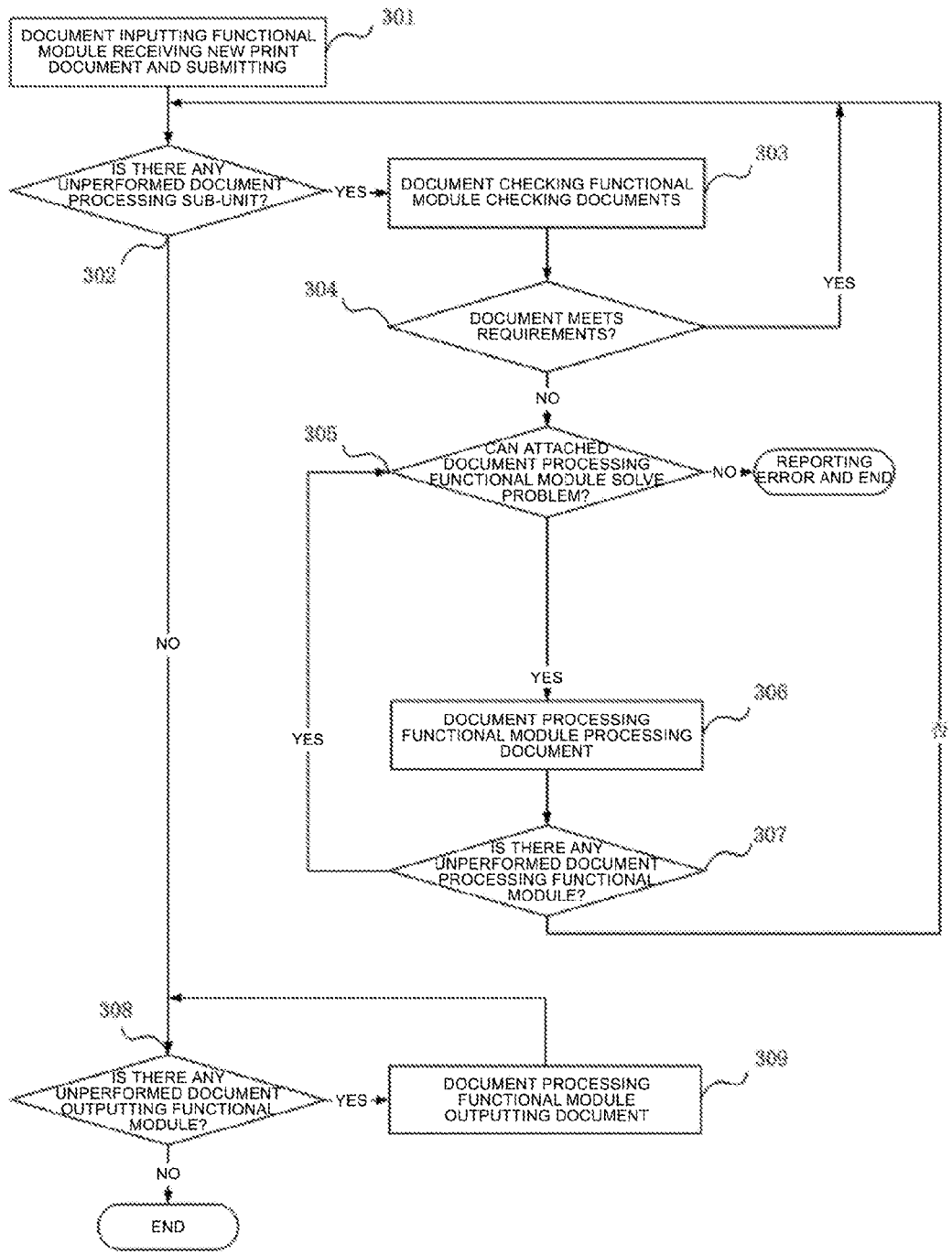
FIG. 3 is a flowchart illustrating the preprocessing on a print document according to an embodiment of the present invention.

FIG. 3 is a flowchart illustrating the preprocessing on a print document according to an embodiment of the present invention.

Step 301, a document inputting functional module 101*a* may provide a user interface to a user for selecting a document, monitor a document directory to obtain a document, or communicate with an external system to obtain a document. After obtaining a document, the document inputting functional module 101*a* may submit the document to the system scheduling unit 104.

Step 302, the system scheduling unit 104 may search for an unperformed document processing sub-unit 102*a* according to a sequence defined in the configuration file. If an unperformed document processing sub-unit 102*a* is found, then the document may be submitted to this document processing sub-unit 102*a*, repeat performing step 303 through step 307, until all the document processing sub-units have performed processing. After the document processing sub-units 102*a* have performed processing, the system scheduling unit 104 may submit the document to the document outputting unit 103, and performing step 308.

Step 303, a document checking functional module 102*b* in the document processing sub-unit 102*a* may check whether the document meets a specified standard, that is whether the document needs further processing.

Step 304, if the document meets the specified standard, then return to step 302, the system scheduling unit 104 may submit the document to a subsequent document processing sub-unit 102*a* for continuing processing. Otherwise, perform step 305, determining whether the non-compliant parts of the document can be resolved by a document processing functional module 102*c* that belongs to the document checking functional module 102*b*.

Step 305, if the document processing functional module 102*c* that belongs to the document checking functional module 102*b* cannot resolve the problems about the print document, for example, the image resolution is too low or the like, then the system scheduling unit 104 may be notified that the document is incorrect, and the print document preprocessing working process may be terminated. Otherwise performing step 306.

Step 306, the document processing functional module 102*c* may perform processing on the document to cause it to meet the specified standard.

Step 307, determining whether there is an unperformed document processing functional module 102*c*, if yes, then repeat performing step 305 and step 306, until all the document processing functional modules 102*c* have performed. Otherwise, it indicates that this document processing sub-unit 102*a* may have completed processing, and the system scheduling unit 104 may be notified that the document may be submitted to a subsequent document processing sub-unit 102*a*, repeating performing step 302 through step 307, until all the document processing sub-units 102*a* have performed.

Step 308 through step 309, the system scheduling unit 104 may submit a document having been processed to all document outputting functional modules 103*a* in the document outputting unit 103. The document outputting functional modules 103*a* may save the document to a specified storage location or submit the document to a related external system.

Figure 4:
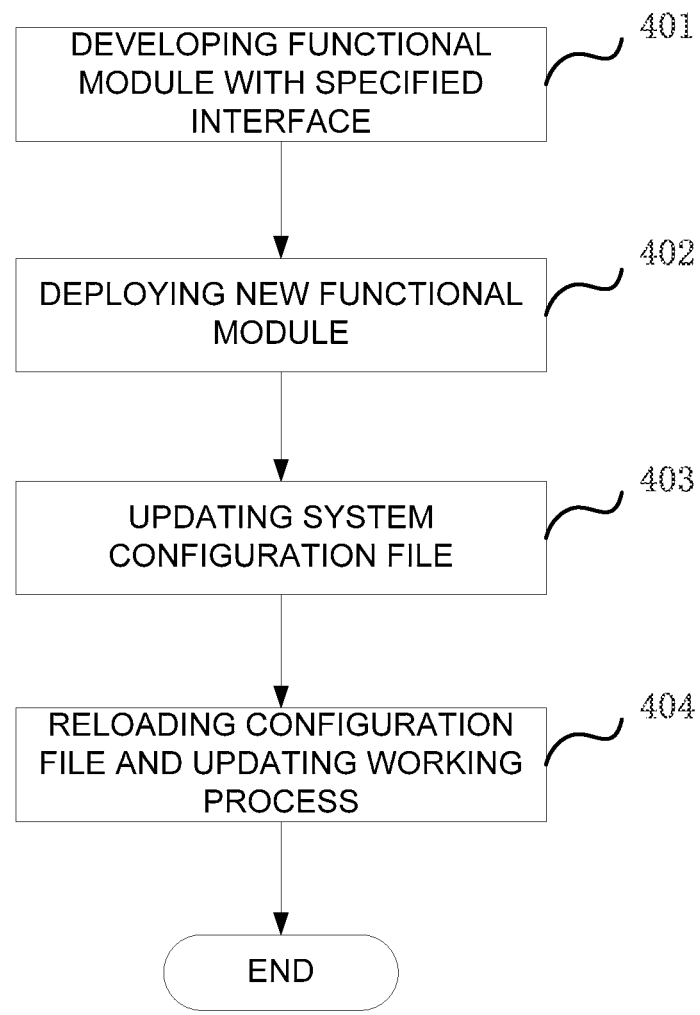
FIG. 4 is a flowchart illustrating the extension of a new function according to an embodiment of the present invention.

FIG. 4 is a flowchart illustrating the extension of a new function according to an embodiment of the present invention.

Step 401, a developer may develop modules having specific functions according to individual requirements from a printing plant. A document input interface, a document checking interface, a document processing interface and a document output interface need to be realized respectively according to different functional categories of the modules. A functional module may obtain document information via a specified interface, and the functions may focus on specific operations performed on the document, regardless of operation process.

Step 402, deploying a program assembly having a new functional module to any storage location accessible by the system scheduling unit 104. All files except the configuration file need no modification.

Step 403, adding a new Module node in a proper position in the configuration file or modifying the Type attribute of an existing Module node may realize adding a new functional module or updating an existing module. A full path of the functional module in the program assembly and the module type may be specified via the Type attribute of the Module node; the working path of the functional module may be specified via the Workpath attribute; the operation parameters of the module may be specified via a Setting node. Information related to the module in the configuration file includes but is not limited to the above description. The category and position in the working process of the module may be specified by the position of the Module node in the configuration file.

Step 404, the system scheduling unit 104 may read a new configuration file, load a new functional module, and reconstruct a working process to complete extension of a new function.

Preferably, the system scheduling unit 104 may monitor changing of the configuration file. If contents of the configuration file change, then the configuration file may be loaded automatically, so as to complete updating of the working process, to avoid system work interruptions due to system restart, which realizes instant adjustment of the working process. At this point, the system scheduling unit 104 needs to make sure of the consistency and integrity of the print documents during the preprocessing procedures.

In summary, using the features for preprocessing print documents, the embodiments according to the present invention may decouple between document processing procedures and document processing functions logically, introduce a system scheduling unit and a mechanism of dynamically constructing working process according to a configuration file, which realizes a system for preprocessing print documents can be easily extended. Thus, along with the automation of preprocessing print documents, and increased efficiency at printing plants, and decreased costs before printing, the difficulty of personalized developing may be decreased, the length of developing cycle may be decreased, and the costs of developing and deploying may be decreased. Therefore, the present invention may overcome the deficiencies of the prior art, help to popularize the system for preprocessing print documents, and have a strong practical significance for improvement of the printing process.

The object of the present invention is not only to replace the existing manual processing with an automatic method, but also to decrease the costs of personalized developing by using a unified developing frame, and that is the significance of "extendable".

Any modification, equivalent replacement, and improvement can be made by skilled in this art under the spirit and principle of the present invention. In this way, if these modification, equivalent replacement, and improvement fall into the scope of the claims or equivalent techniques, then the present invention intended to include these modification, equivalent replacement, and improvement.

What is claimed is:

1. A system realized by a computer for preprocessing print documents that have not yet been printed by a printing plant, the system comprising:
a memory configured to store one or more computer programs; and
a processor configured to realize, when the computer programs stored in the memory are called and executed, the following units:
a document inputting unit configured to receive print documents that have not yet been printed;
a document processing unit configured to process the print documents that have not yet been printed and are received by the document inputting unit; and
a document outputting unit configured to output the print documents that have been processed by the document processing unit,
wherein the document processing unit comprises one or more document processing sub-units, each of the one or more document processing sub-units comprising a document checking functional module and a document processing functional module, the document checking functional module being configured to determine whether the print documents that have not yet been printed comply with a specified standard, and the document processing functional module being configured to process the print documents that have not yet been printed and do not comply with the specified standard.

2. The system according to claim 1, wherein the contents checked by the document checking functional module comprise one or more of the following: document type checking, document size checking, color mode checking, image resolution checking, and typeface checking; and
wherein the processing performed by the document processing functional module comprises one or more of the following: document type conversion, document size adjustment, color mode conversion, image resolution adjustment, and typeface processing.

3. The system according to claim 2, further comprising:
a system scheduling unit configured to provide the document processing unit with the print documents that are received by the document inputting unit for processing, and to provide the document outputting unit with the print documents that have been processed by the document processing unit for outputting.

4. A method performed by a system implemented on a computer for preprocessing print documents that have not yet been printed by a printing plant, the system including a memory configured to store computer programs and a processor configured to realize, when the computer programs stored in the memory are called and executed, a document inputting unit, a document processing unit, and a document outputting unit, wherein the document processing unit comprises one or more document processing sub-units, each of the one or more document processing sub-units comprises a document checking functional module and a document processing functional module, the method comprising:
step A, receiving print documents that have not yet been printed by the document inputting unit;
step B, performing processing, by the document processing unit, on the print documents that have not yet been printed and are received by the document inputting unit, wherein step B comprises:
step B1, determining, by a system scheduling unit, whether there is a document processing sub-unit that has not yet processed the print documents that have not yet been printed among the one or more document processing sub-units,
if yes, then step B2, submitting, by the system scheduling unit, the print documents that have not yet been printed to the document processing sub-unit that has not yet processed the print documents that have not yet been printed for processing,
otherwise, then step C;
step B2 further comprises:
step B11, determining, by the document checking functional module, whether the print documents that have not yet been printed comply with a specified standard,
if yes, then step C,
otherwise, step B12, determining, by the document checking functional module, whether a problem that a part of the print documents that have not yet been printed and do not comply with the specified standard can be solved by the document processing functional module,
if yes, step B13, performing processing on the print documents that have not yet been printed and do not comply with the specified standard so as to cause them to comply with the specified standard by the document processing functional module, then step C,
otherwise, step B14, terminating the method; and
step C, outputting, by the document outputting unit, the print documents that have been processed by the document processing unit.

5. The method according to claim 4, wherein the system for preprocessing the print document further comprises a system scheduling unit, the document inputting unit comprises a document inputting functional module, and step A comprises:
step A1, obtaining, by the document inputting functional module, the print documents that have not yet been printed and providing the obtained print documents to the system scheduling unit.

6. The method according to claim 4, wherein the document outputting unit comprises a document outputting functional module, and step C comprises:
step C1, submitting, by the system scheduling unit, the print documents that have been processed by the document processing unit to the document outputting functional module, and
step C2, saving, by the document outputting functional module, the print documents that have been well processed to a specified storage location or submitting the same to a related external system.

7. The method according to claim 6, wherein the contents of the print documents that have not yet been printed are checked by the document checking functional module comprise one or more of the following: document type checking, document size checking, color mode checking, image resolution checking, and typeface checking; and
wherein the processing performed by the document processing functional module comprises one or more of the following: document type conversion, document size adjustment, color mode conversion, image resolution adjustment, and typeface processing.

8. The method according to claim 7, further comprising:
loading respective functional modules by reading a configuration file of the system for preprocessing the print documents that have not yet been printed by the system scheduling unit, before step A.

9. The method according to claim 8, further comprising:
developing a new functional module according to a requirement proposed by a printing plant;

deploying a program assembly that is used for loading the new functional module to any storage location that the system scheduling unit can access and load;

introducing the new functional module into the configuration file of the system for preprocessing the print document, and updating the configuration file; and loading the new functional module by reading the configuration file that has been updated, by the system scheduling unit, so as to complete a new function extension.

10. A non-transitory storage media storing computer programs for performing preprocessing on print documents that have not yet been printed by a printing plant by using a system realized by a computer, wherein when the computer programs stored in the non-transitory storage media are called and executed, a document inputting unit, a document processing unit, and a document outputting unit are realized, wherein the document processing unit comprises one or more document processing sub-units, each of the one or more document processing sub-units comprises a document checking functional module and a document processing functional module so as to cause the computer to enable the computer programs stored in the non-transitory storage media to carry out the following steps:

step A, receiving, by the document inputting unit, print documents that have not yet been printed;

step B, performing processing, by the document processing unit, on the print documents that have not yet been printed and are received by the document inputting unit, wherein step B comprises:

step B1, determining, by a system scheduling unit, whether there is a document processing sub-unit that has not yet processed the print documents that have not yet been printed among the one or more document processing sub-units, if yes, then step B2, submitting, by the system scheduling unit, the print documents that have not yet been printed to the document processing sub-unit that has not yet processed the print documents that have not yet been printed for processing, otherwise, then step C;

step B2 further comprises:

step B11, determining, by the document checking functional module, whether the print documents that have not yet been printed comply with a specified standard, if yes, then step C, otherwise, step B12, determining, by the document checking functional module, whether a problem that a part of the print documents that have not yet been printed and do not comply with the specified standard can be solved by the document processing functional module, if yes, step B13, performing processing on the print documents that have not yet been printed and do not comply with the specified standard so as to cause them to comply with the specified standard by the document processing functional module, then step C, otherwise, step B14, terminating the method and step C, outputting, by the document outputting unit, print documents that have been processed by the document processing unit.

11. The non-transitory storage media according to claim 10, wherein the system for preprocessing the print document further comprises a system scheduling unit, the document inputting unit comprises a document inputting functional module, and step A comprises:

step A1, obtaining, by the document inputting functional module, the print documents that have not yet been printed and providing the obtained print documents to the system scheduling unit.

12. The non-transitory storage media according to claim 10, wherein the document outputting unit comprises a document outputting functional module, and step C comprises:

step C1, submitting, by the system scheduling unit, the print documents that have been processed by the document processing unit to the document outputting functional module, and step C2, saving, by the document outputting functional module, the print documents that have been well processed to a specified storage location or submitting the same to a related external system.

13. The non-transitory storage media according to claim 12, wherein the contents of the print documents that have not yet been printed checked by the document checking functional module comprise one or more of the following: document type checking, document size checking, color mode checking, image resolution checking, and typeface checking; and wherein the processing performed by the document processing functional module comprises one or more of the following: document type conversion, document size adjustment, color mode conversion, image resolution adjustment, and typeface processing.

14. The non-transitory storage media according to claim 13, further comprising:

loading respective functional modules by reading a configuration file of the system for preprocessing the print documents that have not yet been printed by the system scheduling unit, before step A.

15. The non-transitory storage media according to claim 14, further comprising:

developing a new functional module according to a requirement proposed by a printing plant;

deploying a program assembly that is used for loading the new functional module to any storage location that the system scheduling unit can access and load;

introducing the new functional module into the configuration file of the system for preprocessing the print document, and updating the configuration file; and loading the new functional module by reading the configuration file that has been updated, by the system scheduling unit, so as to complete a new function extension.

* * * * *